Patented Sept. 25, 1945

2,385,761

UNITED STATES PATENT OFFICE 2,385,761

PRODUCTION OF AMINOPYRIMIDINES

Lucas P. Kyrides, Webster Groves, Mo., assignor to Monsanto Chemical Company, St. Louis, Mo., a corporation of Delaware No Drawing. Application April 22, 1944, Serial No. 532,363

7 Claims. (Cl. 260—251)

This invention relates to processes for the production of aminopyrimidines and in particular to processes for the replacement of halogen by hydrogen in halogen-substituted-pyrimidines.

Several processes have been suggested for the production of 2-aminopyrimidine, which is employed as an intermediate in the preparation of valuable therapeutic agents. The processes most frequently employed involve the replacement of chlorine by hydrogen in 2-amino-4-chloropyrimidine by means of zinc dust in alkaline or acid solution, followed by recovery of the product by concentration of the liquor and subsequent crystallization or conversion to double salts of zinc, isolation of the salts, and subsequent decomposition of such salts and recovery of the product by solvent extraction. The reduction in alkaline solution by means of zinc has been reported in the prior art as providing yields of 2-aminopyrimidine ranging from 40–50%. Likewise, the reduction in acid solution has been reported as giving yields of the product ranging from 58–75%. These processes involve recovery of the product from aqueous solutions, a procedure which in general necessitates additional controlled operations for the attainment of a product of satisfactory quality.

The present invention, generally stated, comprises a process for the replacement of halogen by hydrogen in halogenated aminopyrimidines, such as 2-amino-4-chloropyrimidine, 2-amino-4-ethyl-6-chloropyrimidine and 2-amino-4,6-dichloropyrimidine. The process may also be applied to halogenated pyrimidines in which an amino group in the 2-position is further substituted with one or two alkyl, alkoxy, cycloalkyl, aralkyl, aminoalkyl or aryl radicals. The process comprises dissolving or dispersing the halogenated pyrimidine in liquid ammonia, treating the dispersion with metallic sodium, subsequently destroying sodamide formed in the reaction mixture by adding sufficient of an ammonium salt such as ammonium chloride, and thereafter evaporating or flashing the ammonia, extracting the residue with an organic solvent for the pyrimidine such as benzene and crystallizing the product from the solvent.

The following examples will serve to illustrate the process of this invention.

Example I

Two hundred grams of liquid ammonia was placed in a 500 cc. three-neck balloon flask fitted with a stirrer and vent line. The flask was immersed in a bath maintained at −35 to −40° C. Five grams of 2-amino-4-methyl-6-chloropyrimidine was added to the liquid ammonia. Two grams of sodium was added at the rate of approximately $\frac{1}{16}$ gram at a time over a period of about two hours. Thereafter, 2.3 grams of ammonium chloride was added to destroy the sodamide formed in the reaction and the ammonia was evaporated. The residue was extracted several times with hot benzene. The product, 2-amino-4-methyl-pyrimidine, (2.2 grams) was crystallized from the benzene. This product was light yellow in color and had a melting point of 156° C. The product was further identified as 2-amino-4-methyl-pyrimidine by mixed melting point determination with a known specimen of the substance.

Example II

The method of Example I may be applied to the reduction of 2-amino-4-chloropyrimidine to 2-aminopyrimidine, using 4½ grams of 2-amino-4-chloropyrimidine and 2 grams of sodium.

Example III

The method of Example I may be applied to the reduction of 2-amino-4,6-dibromopyrimidine to 2-aminopyrimidine, using 8.8 grams of 2-amino-4,6-dibromopyrimidine and 4 grams of sodium.

Example IV

The method of Example I may be applied to the reduction of 2-amino-4-iodopyrimidine to 2-aminopyrimidine, using 7.7 grams of 2-amino-4-chloropyrimidine and 2 grams of sodium.

The process of the present invention may also be applied to the reduction of halogenated aminopyrimidines in which the amino group is further substituted with one or two alkyl, alkoxy, cycloalkyl, aralkyl, aminoalkyl or aryl radicals, or any two of these, or substituted derivatives of these radicals.

The term "aminopyrimidine" as employed in the specification and claims is intended to describe the aminopyrimidines in which the amino group is unsubstituted.

Any suitable organic solvent may be employed for extracting the residue, for example, toluene, chloroform, naphtha or any solvent for the aminopyrimidine reaction product. In place of metallic sodium, metallic potassium may be employed. In place of ammonium chloride, any suitable ammonium salt or other agent which will destroy or decompose the amide of metallic sodium or potassium in liquid ammonia solution may be employed. For example, the iodide, bromide, acetate or carbonate of ammonia may be used. For purposes of safety and convenience of operation, the halogenated aminopyrimidine is employed in the presence of a minimum amount of water and preferably under anhydrous conditions.

The foregoing description of the invention and the examples are not to be construed as limiting the invention, since the steps of the process, the substances employed and the conditions may be varied without exceeding the scope of the invention defined in the specification and claims.

I claim:

1. A process for producing an aminopyrimidine which comprises dispersing a halogenated aminopyrimidine in liquid ammonia, reacting metallic sodium with the dispersed halogenated aminopyrimidine, decomposing the sodamide formed in the reaction and recovering the aminopyrimidine from the reaction mixture.

2. A process for producing an aminopyrimidine which comprises dispersing a halogenated aminopyrimidine in liquid ammonia, adding to said dispersion metallic sodium in excess of that required stoichiometrically to react with the halogen present in said halogenated aminopyrimidine, thereafter decomposing the sodamide formed in the reaction mixture, evaporating the ammonia and recovering the aminopyrimidine.

3. A process for producing an aminopyrimidine which comprises dispersing a chlorinated aminopyrimidine in liquid ammonia, adding to said dispersion metallic sodium in excess of that requred stoichiometrically to react with the chlorine present in said chlorinated aminopyrimidine, thereafter decomposing the sodamide formed in the reaction mixture, evaporating the ammonia and recovering the aminopyrimidine.

4. A process for producing an aminopyrimidine which comprises dispersing a brominated aminopyrimidine in liquid ammonia, adding to said dispersion metallic sodium in excess of that required stoichiometrically to react with the bromine present in said brominated aminopyrimidine, thereafter decomposing the sodamide formed in the reaction mixture, evaporating the ammonia and recovering the aminopyrimidine.

5. A process for producing an aminopyrimidine which comprises dispersing a halogenated aminopyrimidine in liquid ammonia, adding to said dispersion metallic sodium in excess of that required stoichiometrically to react with the halogen present in said halogenated aminopyrimidine, thereafter decomposing the sodamide formed in the reaction mixture, evaporating the ammonia, extracting the residue with an organic solvent and recovering the aminopyrimidine from the solvent.

6. A process for producing 2-amino-4-methylpyrimidine which comprises dispersing 2-amino-4-methyl-6-chloropyrimidine in liquid ammonia, adding to said dispersion metallic sodium in excess of that required stoichiometrically to react with the chlorine present in said aminopyrimidine, thereafter adding an ammonium salt in amount sufficient to destroy the sodamide formed in the reaction, evaporating the ammonia, extracting the residue with an organic solvent and recovering the aminopyrimidine from the solvent.

7. A process for producing 2-aminopyrimidine which comprises dispersing 2-amino-4-chloropyrimidine in liquid ammonia, adding to said dispersion metallic sodium in excess of that required stoichiometrically to react with the chlorine present in said aminopyrimidine, thereafter adding an ammonium salt in amount sufficient to destroy the sodamide formed in the reaction, evaporating the ammonia, extracting the residue with an organic solvent and recovering the aminopyrimidine from the solvent.

LUCAS P. KYRIDES.